(12) United States Patent
Vrana et al.

(10) Patent No.: US 11,391,701 B2
(45) Date of Patent: Jul. 19, 2022

(54) METHOD FOR CREATING AN ANALYSIS DATASET FOR AN EVALUATION OF AN ULTRASONIC TEST

(71) Applicant: Siemens Energy Global GmbH & Co. KG, Munich (DE)

(72) Inventors: Johannes Vrana, Munich (DE); Hubert Mooshofer, Munich (DE)

(73) Assignee: SIEMENS ENERGY GLOBAL GMBH & CO. KG, Munich (DE)

( * ) Notice: Subject to any disclaimer, the term of this patent is extended or adjusted under 35 U.S.C. 154(b) by 431 days.

(21) Appl. No.: 16/625,410

(22) PCT Filed: Jun. 4, 2018

(86) PCT No.: PCT/EP2018/064565
§ 371 (c)(1),
(2) Date: Dec. 20, 2019

(87) PCT Pub. No.: WO2018/234022
PCT Pub. Date: Dec. 27, 2018

(65) Prior Publication Data
US 2021/0148862 A1    May 20, 2021

(30) Foreign Application Priority Data
Jun. 22, 2017   (DE) ..................... 10 2017 210 508.9

(51) Int. Cl.
*G01N 29/04* (2006.01)
*G01N 29/22* (2006.01)
*G01N 29/06* (2006.01)

(52) U.S. Cl.
CPC ......... *G01N 29/069* (2013.01); *G01N 29/043* (2013.01); *G01N 29/221* (2013.01);
(Continued)

(58) Field of Classification Search
CPC .. G01N 29/069; G01N 29/043; G01N 29/221; G01N 29/2487; G01N 29/262;
(Continued)

(56) References Cited

U.S. PATENT DOCUMENTS 7,054,762 B2 *   5/2006   Pagano .............. G01N 29/2493
                                                            702/39
9,829,468 B2 *  11/2017   Heinrich ............. G01N 29/221
(Continued)

FOREIGN PATENT DOCUMENTS

DE          44 16 829 A1    11/1995    ............. G01N 29/06
DE   10 2013 211 616 A1    12/2014    ............. G01N 29/04
(Continued)

OTHER PUBLICATIONS

Heinrich, D et al., "Manual and Mechanized Ultrasonic Inspection of Large Components in Respect of Flaw Estimation By Fracture Mechanics," Elsevier Science Publishers B.V, Nuclear Engineering and Design 112 (1989), pp. 127-137.
(Continued)

*Primary Examiner* — Jacques M Saint Surin
(74) *Attorney, Agent, or Firm* — Slayden Grubert Beard PLLC

(57) ABSTRACT

Various embodiments include methods for creating an analysis data set for an evaluation of an ultrasonic test of an object comprising: providing a first and second measurement data set, each based on an ultrasonic measurement of a region of the object and a SAFT analysis thereof; associating a first equivalent defect size with a volume element of the first measurement data set associated with at least a portion of the region; associating a second equivalent defect size with a volume element of the second measurement data set associated with at least the portion of the region; creating the analysis data set having at least one volume element which
(Continued)

is associated with at least the portion of the region; and associating a third equivalent defect size with the volume element of the analysis data set, wherein the third is formed from the maximum of the first and second sizes.

10 Claims, 1 Drawing Sheet

(52) U.S. Cl.
CPC ............... *G01N 2291/0289* (2013.01); *G01N 2291/0421* (2013.01)

(58) Field of Classification Search
CPC ............ G01N 29/265; G01N 29/4427; G01N 2291/0289; G01N 2291/0421; G01N 2291/0422; G01S 15/8997
USPC .......................................................... 702/39
See application file for complete search history.

(56) References Cited

U.S. PATENT DOCUMENTS

| | | | | |
|---|---|---|---|---|
| 10,168,301 | B2 * | 1/2019 | Bohm | ................ G01N 29/043 |
| 2003/0144810 | A1 * | 7/2003 | Tabor | ..................... H01L 22/20 |
| | | | | 702/108 |
| 2010/0212431 | A1 | 8/2010 | Clossen-Von Lanken Schulz et al. | ............................ 73/632 |
| 2012/0055252 | A1 | 3/2012 | Boehm et al. | .................. 73/620 |
| 2015/0057953 | A1 | 2/2015 | Heinrich et al. | ................ 702/39 |
| 2016/0209371 | A1 * | 7/2016 | Böhm | .................. G01N 29/069 |

FOREIGN PATENT DOCUMENTS

| | | | | |
|---|---|---|---|---|
| EP | 2 051 070 A1 | 4/2009 | ............. | G01N 29/06 |
| WO | WO-2004075011 A2 * | 9/2004 | ............. | G01R 31/01 |
| WO | 2008/138684 A1 | 11/2008 | ............. | G01N 29/06 |
| WO | 2013/104525 A1 | 7/2013 | ............. | G01N 29/06 |
| WO | 2018/234022 A1 | 12/2018 | ............. | G01N 29/04 |

OTHER PUBLICATIONS

Mooshofer, Hubert et al., "Amplitudenbasierte Fehlergrößenbewertung mit SAFT: Auf dem Weg von der bildlichen Darstellung zum Messverfahren," DGZfP-Jahrestagung 2017, Conference Paper—May 2017, pp. 1-9 (German language w/ English translation).

International Search Report and International Preliminary Report on Patentability, Application No. PCT/EP2018/064565, 14 pages, dated Sep. 25, 2018.

* cited by examiner

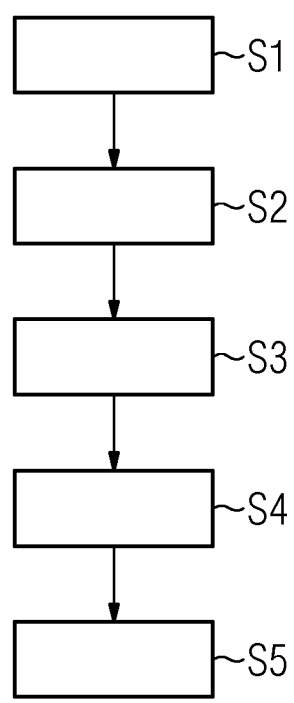

METHOD FOR CREATING AN ANALYSIS DATASET FOR AN EVALUATION OF AN ULTRASONIC TEST

CROSS-REFERENCE TO RELATED APPLICATIONS

This application is a U.S. National Stage Application of International Application No. PCT/EP2018/064565 filed Jun. 4, 2018, which designates the United States of America, and claims priority to DE Application No. 10 2017 210 508.9 filed Jun. 22, 2017, the contents of which are hereby incorporated by reference in their entirety.

TECHNICAL FIELD

The present disclosure relates to ultrasonic testing. Various embodiments may include methods for creating an analysis data set for an evaluation of an ultrasonic test of an object, in particular a component and/or methods for evaluating an ultrasonic test of an object, said test being based on the created analysis data set.

BACKGROUND

In an ultrasonic test of an object, in particular of a component, the associated test volume is tested by means of various individual ultrasonic measurements (scans) and/or various probes and/or by means of various acoustic irradiation directions. In particular, for detecting defects within an object which have a different orientation with respect to one another, multiple acoustic irradiation angles are used in the ultrasonic test of the object. For this purpose, in particular transceiver probes and single-element probes are provided. Furthermore, for the purpose of detectability or detection of near-surface defects, in particular of cracks (corner reflectors) and crack tips, transversely polarized ultrasound (transverse waves) are advantageous.

For example, in the case of an ultrasonic test of a rotationally symmetrical object, a distinction is made between the radial, axial, radial/tangential and axial/tangential acoustic irradiation directions. The axial and axial/tangential ultrasonic test can take place from two different sides with respect to the object. The radial ultrasonic test typically takes place from the outer diameter or inner diameter of the object. The radial/tangential ultrasonic test can take place from the outer diameter of the object. Similarly, a different size of the aperture may be used for each scan of the ultrasonic test. In this case, the size of the aperture may be adjusted to the respective scan.

The probes used in the ultrasonic test may have focusing. Alternatively, probes which are configured as so-called phased-array probes may be used having various focal laws, for example, various apertures, various acoustic irradiation angles, and/or various focal settings.

Based on measurement data sets which were recorded by means of an ultrasonic test, a SAFT (synthetic aperture focusing technique) analysis of the measurement data may take place. In this case, by means of the SAFT (synthetic aperture focusing technique) analysis, the detection limit, the defect evaluation, and the separation of group indications is improved.

Typically, in an ultrasonic test, it is necessary to analyze a complete SAFT-analyzed measurement data set, which entails a correspondingly high level of effort. In other words, it is necessary to analyze each ultrasonic measurement of an ultrasonic test individually, since, as described above, the individual ultrasonic measurements may have been carried out having different requirements and designs. As a result, the analysis of the ultrasonic test of the object is made considerably more difficult.

Various approaches are known for merging individual ultrasound measurements (scans), wherein the ultrasound measurements, for example, were recorded with different probes and/or under different conditions. With the known methods, it is disadvantageous that the result of the merging thereof is typically difficult to interpret. In particular, it is problematic to identify whether a defect is allowable within the object; i.e., whether its defect size is below a permissible defect size.

SUMMARY

The teachings of the present disclosure describe a uniform relationship between at least two ultrasound measurements and thus to improve a creation of an analysis data set underlying the analysis of the ultrasonic test. For example, some embodiments of the teachings herein include a method for creating an analysis data set for an evaluation of an ultrasonic test of an object, comprising the steps of: providing a first and second measurement data set, wherein each measurement data set is based on at least one ultrasonic measurement of a region of the object and a SAFT analysis of the ultrasonic measurement; associating a first equivalent defect size with a least one volume element of the first measurement data set, wherein the volume element of the first measurement data set is associated with at least a portion of the region; associating a second equivalent defect size with at least one volume element of the second measurement data set, wherein the volume element of the second measurement data set is associated with at least the portion of the region; creating the analysis data set having at least one volume element which is associated with at least the portion of the region; and associating a third equivalent defect size with the volume element of the analysis data set, wherein the third equivalent defect size is formed from the maximum of the first and second equivalent defect sizes.

In some embodiments, the volume element of the first measurement data set and the volume element of the second measurement data set may be brought into correspondence to one another by means of a translation, rotation, dilatation, and/or by means of a resampling method.

In some embodiments, a normalization of the first and/or second equivalent defect sizes takes place before the formation of the maximum.

In some embodiments, the first measurement data set is based on an ultrasonic measurement having a first acoustic irradiation direction, and the second measurement data set is based on an ultrasonic measurement having a second acoustic irradiation direction, and in which a normalization of the first and/or second equivalent defect sizes takes place which is dependent on the respective acoustic irradiation direction.

In some embodiments, the normalization takes place by means of an ellipsoid which determines the respective normalization as a function of the respective acoustic irradiation direction.

In some embodiments, the first measurement data set is based on an ultrasonic measurement having a first polarization of the irradiated ultrasound, and the second measurement data set is based on an ultrasonic measurement having a second polarization of the irradiated ultrasound, and in which a normalization of the first and/or second equivalent defect sizes takes place which is dependent on the respective polarization.

In some embodiments, the first measurement data set is based on an ultrasonic measurement using a first ultrasonic probe, and the second measurement data set is based on an ultrasonic measurement using a second ultrasonic probe, and in which a normalization of the first and/or second equivalent defect sizes takes place which is a function of the ultrasonic probe which is used.

In some embodiments, the respective normalization is determined by means of a respective maximally permissible equivalent defect size.

In some embodiments, a normalization of the first and/or second equivalent defect sizes which is dependent on a use of the object takes place before the formation of the maximum.

In some embodiments, a method further includes evaluating defects within the object, in particular their defect sizes, by means of the created analysis data set.

BRIEF DESCRIPTION OF THE DRAWING

Additional advantages, features, and details of the teachings herein result from the exemplary embodiment described below and based on the drawing. The single FIGURE depicts a schematic flow chart of a method incorporating teachings of the present disclosure for creating an analysis data set for an evaluation of an ultrasonic test of an object, in particular a component.

DETAILED DESCRIPTION

Some methods incorporating teachings of the present disclosure for creating an analysis data set for an evaluation of an ultrasonic test of an object, in particular a component, particularly preferably, a rotationally symmetrical component, comprise at least the following steps:
 providing a first and second measurement data set, wherein each measurement data set is based on at least one ultrasonic measurement of a region of the object and a SAFT analysis of the ultrasonic measurement;
 associating a first equivalent defect size with a least one volume element of the first measurement data set, wherein the volume element of the first measurement data set is associated with at least a portion of the region;
 associating a second equivalent defect size with at least one volume element of the second measurement data set, wherein the volume element of the second measurement data set is associated with at least the portion of the region;
 creating the analysis data set having at least one volume element which is associated with at least the portion of the region; and
 associating a third equivalent defect size with the volume element of the analysis data set, wherein the third equivalent defect size is formed from the maximum of the first and second equivalent defect sizes.

In some embodiments, merging takes place of the first and second measurement data sets into the analysis data set, wherein for merging the first and second measurement data set and thus for forming the third equivalent defect size, according to the present invention, the first and second equivalent defect sizes are used by means of forming their maximum. For example, the formation $E_3 = \max(E_1, E_2)$ is possible for real-valued equivalent defect sizes, wherein $E_1$ denotes the first equivalent defect size, $E_2$ the second equivalent defect size, and $E_3$ the third equivalent defect size. Generally, the third equivalent defect size may be a function of the maximum of first and second equivalent defect sizes, wherein the first and second equivalent defect sizes may also be included in the formation of the maximum already adjusted or modified, for example, scaled. In other words, $E_3 = f[\max(g(E_1), h(E_2))]$ is generally true, wherein f, g, and h represent any functions or dependencies.

By forming the maximum, a uniform relationship between the ultrasonic measurements or between the two measurement data sets is established, which enables an improved analysis of the ultrasonic test. The measurement data sets are associated with at least one common portion of the object (portion of the region). In other words, the aforementioned portion of the region of the object is recorded by the first and second measurement data sets. Furthermore, more than two measurement data sets may be provided, wherein in turn, the formation of the maximum takes place via the plurality of the equivalent defect sizes which are associated with the measurement data sets.

The equivalent defect sizes of the measurement data sets may be formed as follows:

For example, if the first measurement data set has an ultrasonic amplitude signal (amplitude for short) for a defect within the object, then, based on the magnitude of the amplitude, an equivalent defect size, i.e., here, the first equivalent defect size, may be associated with it. In this case, the equivalent defect size specifies the dimension or spatial extent of a comparable normalized and/or defined defect. Accordingly, the equivalent defect size does not necessarily specify the actual geometrical size or extent of the defect within the object, but rather, based on the comparison of the magnitude of the amplitudes, represents a normalized defect which is associated with the defect and which has a determined geometrical extent.

Furthermore, the equivalent defect sizes, such as the amplitudes, may be complex-valued. For this purpose, for each ultrasonic amplitude signal from the first and second measurement data set, its associated phase is determined. The ascertained phase then corresponds to the complex phase of the respective equivalent defect size. The ascertainment or determination of the phase may take place by means of a Hilbert transform. However, the maximum is formed via the absolute value of the complex equivalent defect sizes.

By merging the first and second measurement data sets by means of their associated equivalent defect sizes, the methods described herein enable the creation or provision of the analysis data set. As a result, the analysis of the ultrasonic test of the object may take place by means of a common analysis data set which has the third equivalent defect size. In other words, to assess the object, only a single analysis data set must be analyzed. As a result, the effort required for assessing the ultrasonic test is reduced. Furthermore, the evaluation quality may be increased, since an interaction of defects detected in a different way is taken into consideration by the method according to the present invention. In addition, an automated analysis which is based on the created analysis data set is simplified. This may be useful in particular for fracture-mechanical analyses.

When using complex-valued equivalent defect sizes, in addition, the detection limit is improved, since the signal-to-noise ratio (SNR) is improved due to interference in the case of phase-dependent or sign-dependent equivalent defect sizes.

In some embodiments, the methods described herein provide an analysis based on the worst case (also referred to as the worst-case analysis) about the formation of the maximum. As a result, an evaluation of an ultrasonic test of an object with which the created analysis data set is used may be significantly simplified. Thus, for an object which was subjected to an ultrasonic test, a possibly slightly rougher but faster determination may be ascertained as to whether defects of the object lie within or outside permissible defect sizes.

Generally, the region of the object on which first or second measurement data set is based may be different, wherein the regions should overlap at least in one portion (portion of the region). Furthermore, for the purpose of simplification and without a limitation of the protected region, is it assumed that the first and second measurement data sets are based on the same region of the object. Accordingly, the analysis data set is also based on the same region of the object.

If the regions of the first and second measurement data sets do not completely correspond to one another, the volume element of the first measurement data set and the volume element of the second measurement data set may be brought into correspondence to one another by means of a translation, rotation, dilatation, and/or by means of a resampling method. The translation causes a shifting of a volume element, the rotation causes a rotation of a volume element, and the dilatation causes a stretching (or compression) of a volume element. Furthermore, a numeric resampling method may take place which brings the volume element of the first and second measurement data sets into correspondence to one another or establishes their spatial relationship.

In some embodiments, the first and second measurement data sets may respectively be based on fundamentally different conditions or designs of the associated ultrasonic measurement. The first measurement data set may have been ascertained by means of an ultrasonic probe from a first spatial position, and the second measurement data set may have been ascertained by means of an ultrasonic probe, in particular by means of the same ultrasonic probe, from a second spatial position which is different from the first spatial position. In some embodiments, the methods enable the merging of the measurement data sets, which have been recorded under a variety of different conditions. In this case, the uniform relationship of the measurement data sets is established via the equivalent defect size which is associated with them. For creating the analysis data set and thus for creating the uniform relationship of the measurement data sets, the maximum of the associated equivalent defect sizes is used.

In some embodiments, before the formation of the maximum, a normalization of the first and/or second equivalent defect sizes takes place. In other words, a weighted equivalent defect size may be determined. For example, a maximally permissible equivalent defect size for the first equivalent defect size is different from a maximally permissible defect size of the second equivalent defect size. The first and second equivalent defect sizes may be divided by their maximally permissible equivalent defect sizes, i.e., related to them or normalized, before the formation of the maximum. For example, for real-valued equivalent defect sizes, $E_3=\max(E_1/N_1,E_2/N_2)$ is true, wherein $N_1$ denotes the maximally permissible equivalent defect size of the first equivalent defect size, and $N_2$ denotes the maximally permissible equivalent defect size of the second equivalent defect size. With respect to the aforementioned general case, the following are thus true: $f=1$, $g(E_1)=E_1/N_1$ and $h(E_2)=E_2/N_2$. As a result, different maximally permissible equivalent defects which underlie the individual measurement data sets may be taken into consideration.

In some embodiments, the first measurement data set is based on an ultrasonic measurement having a first acoustic irradiation direction, and the second measurement data set is based on an ultrasonic measurement having a second acoustic irradiation direction, wherein a normalization of the first and/or second equivalent defect sizes takes place which is dependent on the respective acoustic irradiation direction. In other words, a weighted third equivalent defect size is formed, wherein the weighting takes place according to different acoustic irradiation directions. In other words, the first and second acoustic irradiation directions are weighted differently. As a result, the weighted third equivalent defect size has a directional dependency. For this purpose, for each ultrasonic measurement, it is necessary to record or ascertain the location-dependent acoustic irradiation direction of the ultrasound. From the ascertained location-dependent acoustic irradiation direction, a maximally permissible equivalent defect size may be determined for the respective equivalent defect size of the first and/or second measurement data sets, based on a directional characteristic of the maximally permissible equivalent defect size. In other words, the maximally permissible equivalent defect size is different for each acoustic irradiation direction. In this case, the directional characteristic specifies the directional dependency of the maximally permissible equivalent defect size.

In this case, the direction-dependent normalization may take place by means of an ellipsoid which determines the respective normalization as a function of the respective acoustic irradiation direction. In other words, the directional characteristic is determined by the ellipsoid.

In some embodiments, the first measurement data set is based on an ultrasonic measurement having a first polarization of the irradiated ultrasound, and the second measurement data set is based on an ultrasonic measurement having a second polarization of the irradiated ultrasound, wherein a normalization of the first and/or second equivalent defect sizes takes place which is dependent on the respective polarization. In other words, different polarizations of the ultrasound which is used are taken into consideration for the ultrasonic measurement of the first measurement data set and for the ultrasonic measurement of the second measurement data set. In this case, a distinction may be made between transverse waves and longitudinal waves. For example, the first measurement data set has been recorded by means of transversely polarized ultrasound (transverse waves), and the second measurement data set has been recorded by means of longitudinally polarized ultrasound (longitudinal waves). As a result, different polarizations of the ultrasonic measurements may advantageously be taken into consideration and may be merged into a common analysis data set, i.e., into the created analysis data set.

In some embodiments, the first measurement data set is based on an ultrasonic measurement using a first ultrasonic probe, and the second measurement data set is based on an ultrasonic measurement using a second ultrasonic probe, wherein a normalization of the first and/or second equivalent defect sizes takes place which is dependent on the ultrasonic probe which is used. In other words, as a result, the difference between the ultrasonic probes may be taken into consideration when merging their associated measurement data sets. In this case, the difference between the ultrasonic probes which are used is expressed in the normalization of the first and/or second equivalent defect sizes which is different, and which is dependent on the ultrasonic probe. In addition, the normalization takes place before the formation of the maximum, so that the difference between the ultrasonic probes is taken into consideration by means of the third equivalent defect size and thus by means of the analysis data set.

Additional normalizations of the first and/or second equivalent defect sizes may be provided before the formation of their maximum. In this case, the normalizations may reflect or take into consideration a variety of differences between the ultrasonic measurements. In particular, some embodiments determine the respective normalization by means of a respective maximally permissible equivalent defect size.

In some embodiments, a normalization of the first and/or second equivalent defect sizes which is dependent on a use of the object takes place before the formation of the maximum. For example, as a result, differently configured defects with which the first or second equivalent defect size is associated may be evaluated as a function of the use of the object. Thus, radial defects may be evaluated or weighted more strongly than axial defects. This is particularly advantageous in the case of a fracture-mechanical analysis.

In some embodiments, the methods for evaluating an ultrasonic test of an object comprise at least the following steps:
creating an analysis data set by means of a method according to the teachings of the present disclosure or one of its embodiments; and
evaluating defects within the object, in particular their defect sizes, by means of the created analysis data set.

In some embodiments, creating an analysis data set for an evaluation of an ultrasonic test of an object, provides advantages which are similar and equivalent to those of the methods described above for evaluating an ultrasonic test of an object.

In a first step S1 of a method incorporating teachings of the present disclosure, a first and second measurement data set are provided, wherein each measurement data set is based on at least one ultrasonic measurement of a region of the object, and on a SAFT analysis of the ultrasonic measurement. In this case, each measurement data set may be based on a variety of conditions and/or designs with respect to its ultrasonic measurement. In particular, the first and second measurement data sets may be recorded from different test positions, by means of different irradiation directions, by means of different ultrasonic probes, and/or by means of different polarizations of the irradiated ultrasound.

In a second step S2, a first equivalent defect size is associated with at least one volume element of the first measurement data set, wherein the volume element of the first measurement data set is associated with at least a portion of the region. In other words, the first measurement data set has at least one ultrasonic amplitude signal which is analyzed by means of a SAFT analysis and which has a certain maximum absolute amplitude. Based on the maximum absolute amplitude, a normalized or defined equivalent defect size is associated with the analyzed ultrasonic amplitude signal. This may take place in particular for a plurality of volume elements of the region.

In a third step S3, a second equivalent defect size is also associated with a volume element of the second measurement data set, wherein the volume element of the second measurement data set is associated with at least the portion of the region. In other words, the volume element within the first measurement data set and the volume element within the second measurement data set at least partially represent the same portion of the region of the object. In other words, the measurement data sets and their associated volume elements should have a spatial relationship with one another and should in particular overlap in at least one subregion of the region (portion of the region).

In particular the second and third steps S2, S3 may be in parallel with respect to time, or serially with respect to time.

In a fourth step S4, the analysis data set is created having at least one volume element, wherein the volume element is associated with at least the portion of the region. In this case, the first measurement data set, the second measurement data set, and the analysis data set may generally have different volume elements, for example, with respect to their size, their arrangement, or their spatial position. In simple terms, it may be assumed that the aforementioned three volume elements correspond to one another, wherein a correspondence of different volume elements may be achieved, for example, by means of a translation, rotation, dilatation, and/or by means of a resampling method.

In a fifth step S5, a third equivalent defect size is associated with the volume element of the analysis data set, wherein the third equivalent defect size is formed from the maximum or by means of the maximum of the first and second equivalent defect sizes. In other words, an analysis takes place which is based on the worst case (also referred to as worst-case analysis), and which may then be based on the evaluation of an ultrasonic test of the object. In this case, the first and second equivalent defect sizes may be normalized before the formation of the maximum, wherein the normalization may take into consideration various conditions and designs of the ultrasonic measurements which underlie the first and second measurement data sets.

Furthermore, the normalization may take place by means of a maximally permissible equivalent defect size. In this case, the maximally permissible equivalent defect size may, for example, be a function of the acoustic irradiation direction of the ultrasound, the spatial position of the ultrasonic probe, and/or the polarization of the irradiated ultrasound. As a result, many different conditions of the ultrasonic measurements underlying the first and second measurement data sets may advantageously be taken into consideration in the creation of the analysis data set. In other words, the present invention enables an advantageous, non-trivial, and synergetic merging of the two measurement data sets into the common analysis data set, wherein the analysis data set takes into consideration the various conditions of the respective ultrasonic measurements. More than two measurement data sets and their merging into a common analysis data set may be provided.

In some embodiments, amplitudes having an absolute value which is below a detection limit of the respective ultrasonic measurement (scan) may be removed from the measurement data sets before the merging of the measurement data sets, by means of forming the maximum. In this case, from the absence of indications, it may only be concluded that the respective ultrasonic amplitude signals, or rather, the associated defects, are below the aforementioned detection limit. Furthermore, the ascertainment or determination of the detection limit may take place in a location-dependent manner.

Although the teachings of the present disclosure have been illustrated and described in detail in part via the preferred exemplary embodiments, the scope of that teaching is not limited by the disclosed examples, or other variations may be derived therefrom by those skilled in the art, without departing from the protective scope of the present disclosure.

What is claimed is:

1. A method for creating an analysis data set for an evaluation of an ultrasonic test of an object, the method comprising:
providing a first and second measurement data set, wherein each measurement data set is based on at least one ultrasonic measurement of a region of the object and a SAFT analysis of the ultrasonic measurement;
associating a first equivalent defect size with a volume element of the first measurement data set, wherein the volume element of the first measurement data set is associated with a portion of the region;
associating a second equivalent defect size with a volume element of the second measurement data set, wherein the volume element of the second measurement data set is associated with the portion of the region;
creating the analysis data set having at least one volume element which is associated with at least the portion of the region; and
associating a third equivalent defect size with the volume element of the analysis data set, wherein the third equivalent defect size is formed from the maximum of the first and second equivalent defect sizes.

2. The method as claimed in claim 1, further comprising bringing the volume element of the first measurement data set and the volume element of the second measurement data set into correspondence to one another using at least one of: of a translation, rotation, dilatation, or resampling.

3. The method as claimed in claim 1, further comprising normalizing the first and/or second equivalent defect sizes before the formation of the maximum.

4. The method as claimed in claim 3, wherein:
the first measurement data set is based on an ultrasonic measurement having a first acoustic irradiation direction; and
the second measurement data set is based on an ultrasonic measurement having a second acoustic irradiation direction;
further comprising normalizing the first and/or second equivalent defect sizes based at least in part on the respective acoustic irradiation direction.

5. The method as claimed in claim 4, wherein the normalization takes place by means of an ellipsoid which determines the respective normalization as a function of the respective acoustic irradiation direction.

6. The method as claimed in claim 3, wherein:
the first measurement data set is based on an ultrasonic measurement having a first polarization of the irradiated ultrasound; and
the second measurement data set is based on an ultrasonic measurement having a second polarization of the irradiated ultrasound;
further comprising normalizing the first and/or second equivalent defect sizes based at least in part on the respective polarization.

7. The method as claimed in claim 3, wherein:
the first measurement data set is based on an ultrasonic measurement using a first ultrasonic probe; and
the second measurement data set is based on an ultrasonic measurement using a second ultrasonic probe;
further comprising normalizing the first and/or second equivalent defect sizes based on a function of the ultrasonic probe which is used.

8. The method as claimed in claim 3, further comprising determining the respective normalization using a respective maximally permissible equivalent defect size.

9. The method as claimed in claim 3, further comprising normalizing the first and/or second equivalent defect sizes based on a use of the object before forming the maximum.

10. The method as claimed in claim 1, further comprising evaluating defects within the object using the created analysis data set.

* * * * *